C. COLLIER.
VEHICLE WHEEL.
APPLICATION FILED MAY 21, 1909.
986,691.
Patented Mar. 14, 1911.
2 SHEETS—SHEET 1.
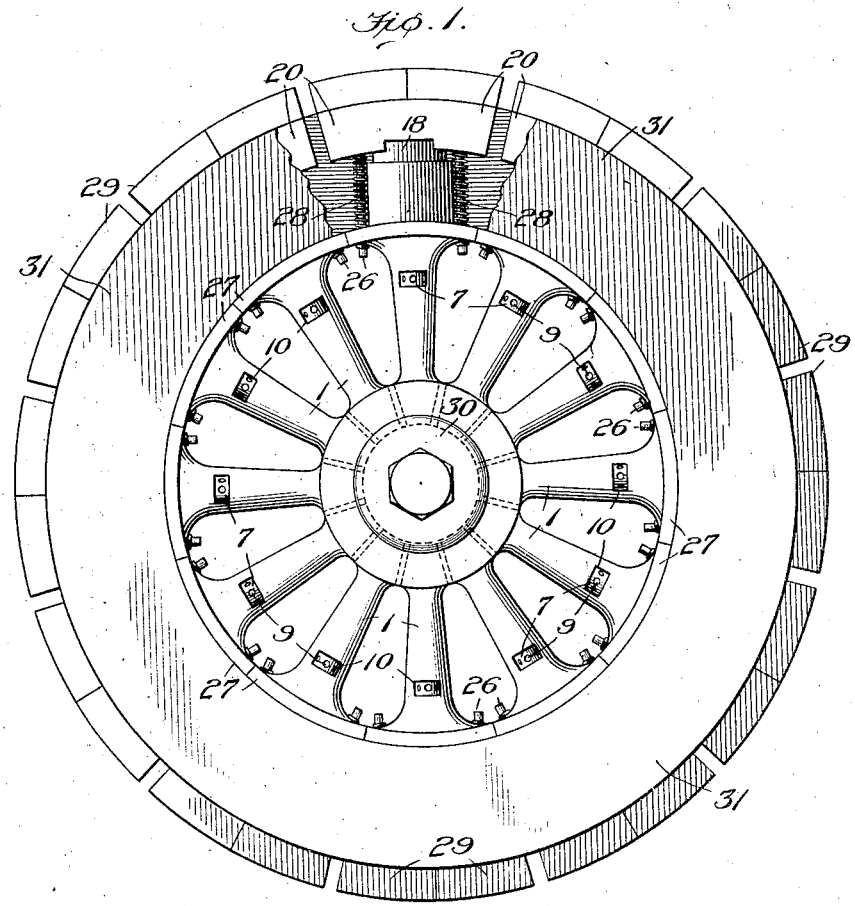
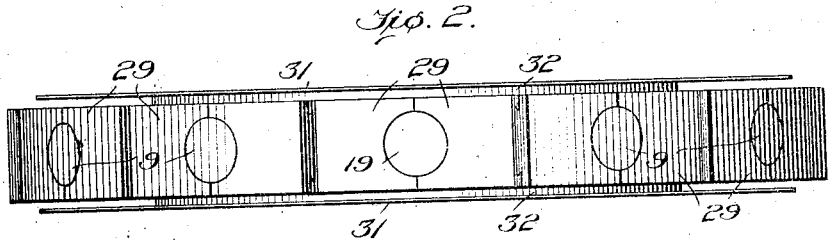
Witnesses
Edwin L. Bradford
Inventor
Charles Collier,
By Wm O. Boyce
Attorney C. COLLIER.
VEHICLE WHEEL.
APPLICATION FILED MAY 21, 1909.
986,691.
Patented Mar. 14, 1911.
2 SHEETS—SHEET 2.
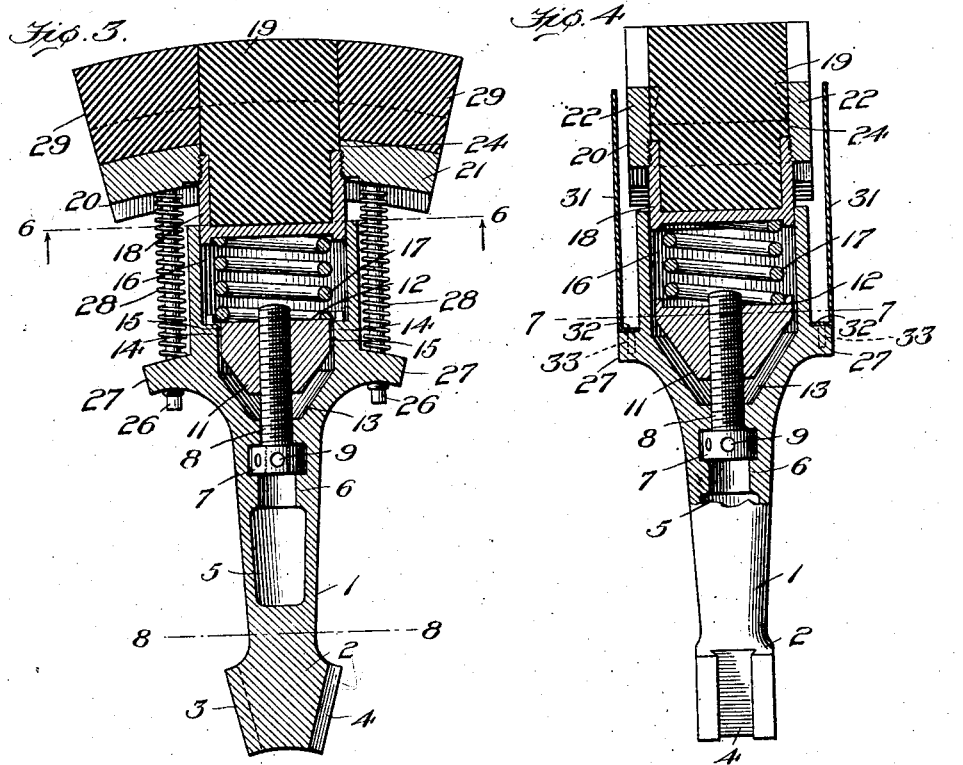
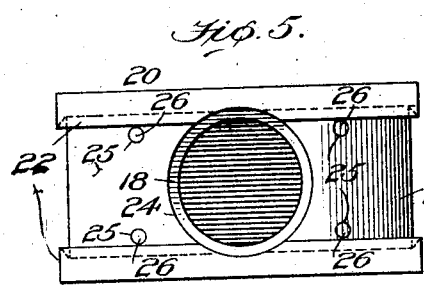
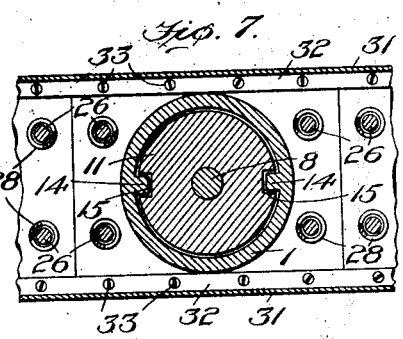
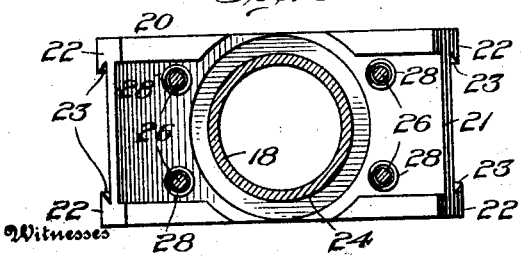

UNITED STATES PATENT OFFICE.

CHARLES COLLIER, OF CLEVELAND, OHIO.

VEHICLE-WHEEL.

986,691.   Specification of Letters Patent.   Patented Mar. 14, 1911.

Application filed May 21, 1909. Serial No. 497,461.

*To all whom it may concern:*

Be it known that I, CHARLES COLLIER, a citizen of the United States, residing at Cleveland, in the county of Cuyahoga and State of Ohio, have invented certain new and useful Improvements in Vehicle-Wheels; and I do hereby declare the following to be a full, clear, and exact description of the invention, such as will enable others skilled in the art to which it appertains to make and use the same.

My invention relates to wheels for vehicles in general, but is designed and arranged more especially for use upon automobiles, and with still greater particularity may be classed as a resilient automobile wheel of the cushion tire type; although it will be apparent, that wheels embodying the characteristic features of this invention may be applied to vehicles of all descriptions large or small, heavy draft or light, the principle of operation remaining the same:

The invention has for its object to materially increase the durability of both wheels and tires; to facilitate the assembling, interchanging or replacing of parts; to provide means, always accessible, for readily adjusting the tread surface of the tires to meet the varying conditions of load or road surface; and to provide a wheel having a series of corresponding spokes each comprising a complete self-contained coöperating set of interchangeable parts.

The invention also contemplates and includes certain novel structural features, their arrangement and combination, substantially as shown, whereby a completed wheel is produced.

The invention will be hereinafter particularly described and pointed out in the claims following.

In the accompanying drawings which form part of this application, and whereon corresponding numerals refer to like parts in the several views: Figure 1 represents the complete wheel in side elevation, partly broken away at top of figure to disclose interior parts, Fig. 2 is a plan view of the tread surface of the invention, Fig. 3 is a longitudinal central section taken through one spoke and a section of the cushion tire or tread surface, Fig. 4 is also a longitudinal section through parts shown by Fig 3, but at right angles thereto, Fig. 5 is a plan view of one rim member detached, Fig. 6 is a transverse section through one spoke on the line 6—6, Fig. 3, looking in the direction indicated by arrows. Fig. 7 is also a transverse section taken on the line 7—7, Fig. 4, and, Fig. 8 is a transverse section through inner end of one spoke on the line 8—8, Fig. 3.

Reference being had to the drawings and numerals thereon, 1 indicates the wheel spokes which are counterparts one of the other, each comprising a number of coöperating component elements, and each carrying as a part of the unitary or self-contained structure a section of the wheel rim and tire. Accordingly a description of one of said spokes in combination with its particular wheel rim section and cushion tire sections will suffice for all, it being understood that the completed wheel is formed by merely bringing together, or securing together a plurality of such unitary parts.

At its innermost end the spoke 1 is somewhat enlarged as at 2, and is configured upon opposite sides of said enlargement by trapezoidal tenons and indentures, 3 and 4, respectively, as the means of securing a plurality of such spokes together in dovetailed relation, and of thus forming a wheel hub, as shown by Fig. 1 of the drawings. Adjacent to its enlarged end 2 spoke 1 is cored out longitudinally for purposes of lightness as at 5, and shouldered as at 6, while resting upon shoulder 6 as best shown by Figs. 3 and 4, is the head 7 of a tension screw 8, provided with radial holes 9 to which access may be had at all times by agency of an ordinary wrench pin (not shown) through an opening 10 in the face of the spoke. In threaded connection with said screw 8 is a tension block 11, by preference in the form of an inverted truncated cone, having a flanged and slightly depressed outer surface 12 to serve as a spring seat, and adapted to partake of a reciprocal movement, under control of said tension screw 8, contained as aforesaid in the relatively enlarged chamber 13 also formed within spoke 1. At points diametrically opposite, this chamber 13 is provided with radial webs 14, 14 engaging corresponding grooves 15, 15 in the exterior of said tension block 11 for the purpose of guiding the latter in its reciprocal movements as best shown by Fig. 7. Communicating directly with the said chamber 13 is a somewhat enlarged spring pocket 16 within which, and seated in the depressed spring seat 12 of the block 11, is a coiled absorption spring 17. Resting upon the outer end of said spring 17 is a follower 18 slightly depressed upon its inner surface to receive the spring and of a form to correspond with that of the interior of the spring pocket 16 within which it is adapted to reciprocate. This follower is by preference, but not necessarily, of cylindrical form open at its outer end to snugly receive a resilient plug 19, such as rubber, forming part of the cushion tire; it is also screw threaded upon its outer periphery as shown to receive in screw threaded connection a rim section 20, having a base 21, upstanding sides 22, oppositely undercut as at 23, and a central aperture 24 through which the plug 19 projects. Projecting inwardly from rim section 20 through bolt holes 25, and adjacent to the aperture 24, are bolts 26 loosely engaging at their opposite ends flange 27, which, as shown by Fig. 3, surrounds each spoke 1. Surrounding each of the bolts 26 is a coiled compression spring 28 which springs are thus interposed between the spoke and rim section so as to resist or cushion the radial movement of the latter; while secured in the channeled surface of the rim section 20 in dovetailed relation, upon both sides of the projecting cushion plug 19, are additional cushions of rubber or other resilient material, 29, 29, which together snugly surround the plug 19, as best shown in plan by Fig. 2. This being a description of one complete spoke and dependent parts, it is quite obvious that a plurality of such may be readily secured together by agency of the dovetailed hub connection hereinafter described, in the manner indicated by Fig. 8, to form a complete wheel. It then remains to provide the wheel hub with a suitable bushing, (not shown) to render it more ornamental by employment of a central covering disk 30, and finally in like manner to conceal from view the outer end of all spokes and their respective rim sections at points of reciprocal connections, by agency of a continuous side guard 31 upon each side of the structure, having an angular inner edge 32 by which it is screwed or bolted to the spokes 1 as best shown at 33, Figs. 4 and 7.

This being a description of my invention in its preferred form of construction, it will be noted that the parts hereinbefore described may be greatly varied in size, shape, material, and in general arrangement without departing from the spirit of the invention as hereinafter claimed. Its purposes and uses are those of vehicle wheels generally, particular reference being had to automobile and horseless vehicles of both heavy and light construction, in which latter connection aluminum is employed, so far as practicable, as a means of reducing to a minimum the weight of the structure. Further than this the use and advantages of my invention will be quite apparent to persons skilled in the art to which it relates, and need not be herein dwelt upon.

Having thus described my invention, what I now claim and desire to secure by Letters Patent is:

1. In a resilient vehicle-wheel, the combination with a hub, of a plurality of spokes radiating from said hub, a radially movable rim section for each of said spokes, a follower member projecting from said rim section toward the hub, resilient means interposed between said follower and spoke, a tire section secured to said rim section, and an independent resilient plug projecting through said tire and rim sections and seated in the follower member aforesaid.

2. In a resilient vehicle-wheel the combination with a hub, of a plurality of spokes radiating from said hub, a radially movable rim section for each of said spokes, a follower member projecting from said rim section toward the hub, resilient means interposed between said follower and spoke, a two-part tire section secured to said rim section, and an independent resilient plug projecting through said tire and rim sections and seated in the follower member aforesaid.

3. In a resilient vehicle-wheel, the combination with a hub, of a plurality of spokes radiating from said hub, a radially movable rim section for each of said spokes, a follower member projecting from said rim section toward the hub, resilient means interposed between said follower and spoke, a tire section in dovetailed connection with said rim section, and an independent resilient plug projecting through said tire and rim sections into the follower member aforesaid.

4. In a resilient vehicle-wheel the combination with a hub, of a plurality of spokes radiating from said hub, a radially movable rim section for each of said spokes, a follower member projecting from said rim section toward the hub, resilient means interposed between said follower and spoke, a two-part tire section the parts having concave abutting edges, and an independent resilient plug projecting through said concavities, also through the said rim section and seated in the follower member.

5. In a resilient vehicle-wheel, the combination with a hub, of a plurality of hollow spokes radiating from said hub, a radially movable rim section for each of said spokes, a follower member projecting inwardly from said rim section, a tire section secured to said rim section, an independent resilient plug projecting through said tire and rim sections into the follower member aforesaid, an absorption spring interposed between said follower and spoke, a tension screw having its head swiveled within the spoke, and a radially movable tension block threaded upon said screw for placing the absorption spring under tension.

6. In a resilient vehicle-wheel the combination with a hub, of a plurality of hollow spokes radiating from said hub, a radially movable rim section for each of said spokes, a cup-shaped follower member projecting inwardly from said rim section, a tire section secured to said rim section, an independent resilient plug projecting through said tire and rim sections into the follower member aforesaid, an absorption spring interposed between said follower and spoke, a tension screw within said spoke, a radially movable tension block threaded upon said screw for placing the absorption spring under tension, and radially arranged webs and grooves upon opposite sides of said hollow spoke and tension block respectively for guiding the latter in its radial movement.

7. In a resilient vehicle-wheel the combination with a hub having a plurality of hollow spokes radiating therefrom, of a rim section carried by the outer end of each spoke and radially movable with relation thereto, a tire section mounted in each of said rim sections, an absorption spring within each of said hollow spoke bearing upon its particular rim section, means also within each spoke for adjusting the tension of its said absorption spring, and exterior springs surrounding the upper end of each spoke between relatively fixed points of support upon the latter and its particular rim section.

8. In a resilient vehicle-wheel the combination with a hub having a plurality of hollow spokes radiating therefrom, of a rim section carried by the outer end of each spoke and radially movable with relation thereto, a tire section mounted in each of said rim sections, an absorption spring within each of said hollow spokes bearing upon its particular rim section, means also within each spoke for adjusting the tension of its absorption spring, exterior springs surrounding the upper end of each spoke between relatively fixed points of support upon the latter and its particular rim section, and circumferential guards surrounding the entire structure upon opposite sides of all spokes and rim sections.

9. In a resilient vehicle-wheel the combination with a hub having a plurality of hollow spokes radiating therefrom, of a rim section carried by the outer end of each spoke and radially movable with relation thereto, a tire section mounted in each of said rim sections, an absorption spring within each of said hollow spokes bearing upon its particular rim section, means also within each spoke for adjusting the tension of its said absorption spring, exterior springs surrounding the upper end of each spoke between relatively fixed points of support upon the latter and its particular rim section, and circumferential guards each having a stiffening flange whereby it is attached to all spokes upon opposite sides of the structure.

In testimony whereof I affix my signature, in presence of two subscribing witnesses.

CHARLES COLLIER.

Witnesses:
 MEDA L. CARR,
 GEORGE A. COLLIER.